United States Patent Office 3,492,348
Patented Jan. 27, 1970

3,492,348
PREPARATION OF VINYL SULFONYL
FLUORIDES
Max M. Boudakian, Gene A. Hyde, and Ehrenfried H.
Kober, Hamden, Conn., assignors to Olin Mathieson
Chemical Corporation, New Haven, Conn., a corporation of Virginia
No Drawing. Filed Apr. 20, 1966, Ser. No. 543,797
Int. Cl. C07c 143/70
U.S. Cl. 260—543    3 Claims

ABSTRACT OF THE DISCLOSURE

Partially fluorinated vinyl sulfonyl fluorides having the formula $$RCF=CHSO_2F$$

wherein R is hydrogen, fluorine, alkyl or fluoro-substituted alkyl are provided by reacting an alkenyl fluoride with pyrosulfuryl fluoride at a temperature range of about 200–400° C. These partially fluorinated vinyl sulfonyl fluorides are useful and valuable fumigants.

This invention relates to a series of partially fluorinated vinyl sulfonyl fluorides and a process for their preparation. More specifically, it relates to compounds having the general formula:

$$RCF=CHSO_2F$$
(I)

where R is hydrogen, fluorine, alkyl, or fluoro-substituted alkyl.

Perfluorinated vinyl sulfonyl fluorides have previously been prepared, as for example disclosed in U.S. Patent 3,041,317, by a multistep process which comprises reacting a perfluoroolefin and sulfur trioxide to form a sultone; hydrolyzing the isolated sultone to form a hydrofluoroalkyl sulfonyl fluoride; and finally contacting said fluoride with a catalyst comprising a mixture of an alkali metal chloride and chromium oxide to yield a fluorovinyl sulfonyl fluoride. This process, while providing the desired perfluorinated vinyl sulfonyl fluorides, is commercially undesirable because it results in the over-all loss of a $CF_2$ group.

Now it has been found that partially fluorinated vinyl sulfonyl fluorides are provided in good purity by the reaction of alkenyl fluorides with pyrosulfuryl fluoride ($S_2O_5F_2$). As used in the disclosure and claims herein the term "alkenyl fluoride" represents a compound having at least two hydrogen and one fluorine atoms bonded to olefinic carbon atoms. The reaction of $S_2O_5F_2$ in this manner was surprising and unexpected since it has been found that alkenyl fluorides do not react with sulfuryl fluoride ($SO_2F_2$). In accordance with the above definition of appropriate alkenyl fluorides, it has been found that $S_2O_5F_2$ does not react in a similar manner with 1-chloro-1,2,2-trifluoroethene.

The reaction of pyrosulfuryl fluoride with the aforementioned alkenyl fluorides in the process of this invention is believed to proceed in accordance with the following equations wherein, for example, 1,1-difluoroethene is utilized as the alkenyl fluoride:

(A)  $CF_2=CH_2+S_2O_5F_2 \rightarrow [CF_3CH_2SO_2F]+SO_3$
(B)  $[CF_3CH_2SO_2F] \rightarrow CF_2=CHSO_2F+HF$
(I)

Although any unsaturated moiety falling within the aforementioned definition of alkenyl fluoride may be employed in the practice of this invention, preferred reactants include alkenyl fluorides of the $RCF=CH_2$ type where R is hydrogen, fluorine, alkyl having 1–4 carbon atoms or fluoro-substituted alkyl. Illustrative of such alkenyl fluorides are vinyl fluoride; 1,1-difluoroethene; 2,3,3,3 - tetrafluoropropene - 1; 2,3,3,4,4,4 - hexafluorobutene-1; 2,3,3-trifluoro-propene-1, and the like.

In contrast to the previously described multi-step process utilized for the preparation of the perfluorinated vinyl sulfonyl fluorides, the process described herein is a convenient one-step operation. Briefly, it comprises heating the reactants at a temperature range of 200°–400° C. and preferably at 275°–325° C. Upon completion of the reaction period, the desired derivatives are isolated using conventional distillation procedures.

The partially fluorinated vinyl sulfonyl fluorides provided by the process disclosed herein are useful and valuable fumigants. Furthermore, Diels-Alder adducts can be readily provided by the reaction of a wide variety of dienes with the compounds I. Included among the suitable dienes which may be employed in such Diels-Alder reactions are cyclopentadiene, hexachlorocyclopentadiene, butadiene, anthracene, and the like. Thus, the Diels-Alder adduct of hexachlorocyclopentadiene with 2,2-difluorovinylsulfonyl fluoride is useful as an insecticide and nematocide.

The following example will serve to illustrate the preparation of the compounds included in the general Formula I in accordance with the process of this invention.

EXAMPLE

Into a 150 ml. Monel cylinder equipped with a Monel needle valve and a pressure gauge and fitted with a heating mantle was placed 0.122 mole of 1,1-difluoroethene and 0.120 mole of pyrosulfuryl fluoride. The mixture was heated at 300° C. for 6 hours. After cooling the mixture to room temperature, the cylinder was attached to a vacuum line and volatile material collected. The product was separated by vapor phase chromatography. Mass spectral analysis showed the presence of a molecular ion at m/e 146, indicating that 2,2-difluorovinyl sulfonyl fluoride with a molecular weight of 147 had been formed. The infrared spectrum showed unsaturation at $5.8\mu$, a CH band at $3.2\mu$, and a 1,1,2-trisubstitution at $12.5\mu$. Bands at $7.35\mu$ and $8.45\mu$ indicated the presence of an $SO_2F$ group. Thus, both the infrared and mass spectral data show that 2,2-difluorovinyl sulfonyl fluoride was formed. By-products of the reaction included 1,1,1-trifluoroethane, 1,1-difluoroethane fluorosulfonate and 2,2,2-trifluoroethane sulfonyl fluoride.

We claim:
1. A process for the preparation of partially fluorinated vinyl sulfonyl fluorides which comprises reacting an al- kenyl fluoride having the formula $RCF=CH_2$ wherein R is hydrogen, fluorine, alkyl having 1–4 carbon atoms or fluoro-substituted alkyl with pyrosulfuryl fluoride at a temperature range of about 200°–400° C.

2. The process of claim 1 where a reaction temperature range of 275°–325° C. is employed.

3. The process of claim 1 where 2,2-difluorovinyl sulfonyl fluoride is provided by reacting 1,1-difluoroethene with pyrosulfuryl fluoride.

References Cited

UNITED STATES PATENTS 2,884,452  4/1959  Scherer et al.
3,041,317  6/1962  Gibbs et al. _____ 260—79.3

LORRAINE A. WEINBERGER, Primary Examiner

H. C. WEGNER, Assistant Examiner

U.S. Cl. X.R.

260—999